United States Patent
Chang et al.

(10) Patent No.: US 12,078,544 B2
(45) Date of Patent: Sep. 3, 2024

(54) TEMPERATURE CALIBRATION METHOD OF INFRARED THERMAL IMAGE CAMERA AND CALIBRATION METHOD OF TEMPERATURE SENSING SYSTEM OF INFRARED THERMAL IMAGE CAMERA

(71) Applicant: RADIANT INNOVATION INC., Hsinchu County (TW)

(72) Inventors: Yung-Chang Chang, Hsinchu County (TW); Chien-Wen Huang, Hsinchu County (TW); Yi-Chun Tsai, Hsinchu County (TW); Feng-Lien Huang, Hsinchu (TW)

(73) Assignee: RADIANT INNOVATION INC., Hsinchu County (TW)

( * ) Notice: Subject to any disclaimer, the term of this patent is extended or adjusted under 35 U.S.C. 154(b) by 967 days.

(21) Appl. No.: 17/095,719

(22) Filed: Nov. 11, 2020

(65) Prior Publication Data

US 2022/0146319 A1  May 12, 2022

(51) Int. Cl.
  *G01J 5/00* (2022.01)
  *G01J 5/80* (2022.01)
(52) U.S. Cl.
  CPC .......... *G01J 5/00* (2013.01); *G01J 2005/0077* (2013.01); *G01J 5/80* (2022.01)
(58) Field of Classification Search
  CPC ........ G01J 5/00; G01J 5/80; G01J 2005/0077; G01J 5/53
  See application file for complete search history.

(56) References Cited

U.S. PATENT DOCUMENTS

| | | | | |
|---|---|---|---|---|
| 5,150,969 A | * | 9/1992 | Goldberg | G01J 5/02 374/129 |
| 2003/0095583 A1 | * | 5/2003 | Maccarone | G01J 5/02 374/2 |
| 2018/0180485 A1 | * | 6/2018 | Macmillan | G01J 5/10 |
| 2019/0195694 A1 | * | 6/2019 | Tang | G01J 5/56 |
| 2021/0293626 A1 | * | 9/2021 | Winzell | G01J 5/007 |

OTHER PUBLICATIONS

Chen C, Weng YK, Shen TC. Performance evaluation of an infrared thermocouple. Sensors (Basel). 2010;10(11):10081-94. doi: 10.3390/s101110081. Epub Nov. 10, 2010. PMID: 22163458; PMCID: PMC3231037. (Year: 2010).*

* cited by examiner

*Primary Examiner* — Brandi N Hopkins
*Assistant Examiner* — Janice M Soto
(74) *Attorney, Agent, or Firm* — Li & Cai Intellectual Property Office (57) ABSTRACT

A temperature calibration method of an infrared thermal image camera and a calibration method of a temperature sensing system of an infrared thermal image camera are provided. The temperature calibration method of the infrared thermal image camera includes: providing a temperature sensing system to measure an object under test, so as to obtain an uncalibrated temperature; and calibrating the uncalibrated temperature to obtain a calibrated temperature, according to the uncalibrated temperature and a temperature calibration function. The temperature calibration function is obtained through a regression analysis.

11 Claims, 5 Drawing Sheets

FIG. 5 utilizing the first infrared temperature sensor to measure a radiation energy of a first predetermined position of the object under test to generate a first digital signal, utilizing the jth infrared temperature sensor to measure a radiation energy of a jth predetermined position of the object under test to generate a jth digital signal, and utilizing the nth infrared temperature sensor to measure a radiation energy of a nth predetermined position of the object under test to generate a nth digital signal —S2022 calculating the first uncalibrated temperature of the object under test according to the first digital signal and the first temperature measurement equation, calculating the jth uncalibrated temperature of the object under test according to the jth digital signal and the jth temperature measurement equation, and calculating the nth uncalibrated temperature of the object under test according to the nth digital signal and the nth temperature measurement equation —S2024

FIG. 6 providing a temperature sensing system to measure an object under test to obtain a first uncalibrated temperature and a second uncalibrated temperature —S302 calibrating the first uncalibrated temperature to a first calibrated temperature, and calibrating the second uncalibrated temperature to a second calibrated temperature, according to the first uncalibrated temperature, the second uncalibrated temperature, the first temperature calibration function, and the second temperature calibration function —S304

TEMPERATURE CALIBRATION METHOD OF INFRARED THERMAL IMAGE CAMERA AND CALIBRATION METHOD OF TEMPERATURE SENSING SYSTEM OF INFRARED THERMAL IMAGE CAMERA

FIELD OF THE DISCLOSURE

The present disclosure relates to a temperature calibration method and a calibration method of a temperature sensing system, and more particularly to a temperature calibration method of an infrared thermal image camera and a calibration method of a temperature sensing system of an infrared thermal image camera.

BACKGROUND OF THE DISCLOSURE

Generally, a non-contact infrared temperature sensing system has a filter, which blocks and prevents the visible light from interfering with a measured value of the infrared temperature sensing system. However, a configuration of the filter could still affect a measurement of a temperature of an object under test, causing the measured temperature to be inaccurate.

Therefore, it has become an important issue for the industry to increase the accuracy of the temperature sensing system.

SUMMARY OF THE DISCLOSURE

In response to the above-referenced technical inadequacies, the present disclosure provides a temperature calibration method of an infrared thermal image camera and a calibration method of a temperature sensing system of an infrared thermal image camera.

In one aspect, the present disclosure provides a temperature calibration method of an infrared thermal image camera, which includes: providing a temperature sensing system to measure an object under test, so as to obtain an uncalibrated temperature; and calibrating the uncalibrated temperature to obtain a calibrated temperature, according to the uncalibrated temperature and a temperature calibration function. The temperature calibration function is obtained through a regression analysis.

In another aspect, the present disclosure provides a temperature calibration method of a temperature sensing system of an infrared thermal image camera, which includes: providing a black body with a preset temperature; obtaining a calibration coefficient and a system temperature coefficient of the temperature sensing system; providing a plurality of radiation black bodies, and the plurality of radiation black bodies respectively have a plurality of preset temperatures that are different from one another; utilizing the temperature sensing system to measure the plurality of radiation black bodies to obtain a plurality of measured temperatures; conducting a regression analysis to the plurality of measured temperatures and the plurality of preset temperatures, so as to obtain an initial temperature calibration function, and utilizing the initial temperature calibration function to obtain a temperature calibration function. In a step of obtaining the calibration coefficient and the system temperature coefficient, an initial temperature measurement equation is utilized to obtain the calibration coefficient and the system temperature coefficient, and the initial temperature measurement equation includes the following relation: $S=G1\times(1+tCo1\times(T_{amb}-T_{de}))\times((T_{objNA})^4-(T_{amb})^4)$. S is an initial digital signal that is obtained through the temperature sensing system measuring the black body. G1 is the calibration coefficient. tCo1 is the system temperature coefficient. $T_{amb}$ is the environment temperature, and the environment temperature is in Kelvin. $T_{de}$ has a temperature of 298.15K. $T1_{objNA}$ is the preset temperature of the black body, the preset temperature is in Kelvin, and the preset temperature of the black body is known.

In yet another aspect, the present disclosure provides a temperature calibration method of an infrared thermal image camera, which includes: providing a temperature sensing system to measure an object under test, so as to obtain n uncalibrated temperatures, and calibrating each of the n uncalibrated temperatures to a calibrated temperature, according to the n uncalibrated temperatures and the n temperature calibration functions, so as to obtain the n calibrated temperatures. The temperature sensing system includes n infrared temperature sensors, the n infrared temperature sensors have n corresponding temperature calibration functions, respectively, and the n infrared temperature sensors are disposed in an array of R×L, where R is a positive integer greater than or equal to 2, L is a positive integer greater than or equal to 2, and n has a quantity of R multiplying L. The n infrared temperature sensors are disposed sequentially from a first infrared temperature sensor to an nth infrared temperature sensor, and each of the n infrared temperature sensors respectively measures the object under test to obtain the n uncalibrated temperatures. Each of the n uncalibrated temperatures respectively corresponds to one of the corresponding n temperature calibration functions, and each of the first infrared temperature sensor to the nth infrared temperature sensor measures the object under test to obtain a corresponding first uncalibrated temperature to a corresponding nth uncalibrated temperature, respectively. The n temperature calibration functions are respectively obtained through a regression analysis.

One of the advantages of the present disclosure is that the temperature calibration method of the infrared thermal image camera is able to increase the accuracy of the infrared thermal image camera through calibrating the uncalibrated temperature to obtain a calibrated temperature according to the uncalibrated temperature and a temperature calibration function. Moreover, the calibration method of the temperature sensing system of the infrared thermal image camera provided by the present disclosure is able to increase the accuracy of the temperature sensing system of the infrared thermal image camera through the temperature calibration function. The accuracy of the temperature sensing system of the infrared thermal image camera can be increased through conducting a regression analysis to the plurality of measured temperatures and the plurality of predetermined temperatures to obtain an initial temperature calibration function, and utilizing the initial temperature calibration function to obtain a temperature calibration function.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 6 is a flow chart of step S202 of the temperature calibration method of the infrared thermal image camera in the first embodiment of the present disclosure.

FIG. 7 is yet another flow chart of the temperature calibration method of the infrared thermal image camera in the first embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
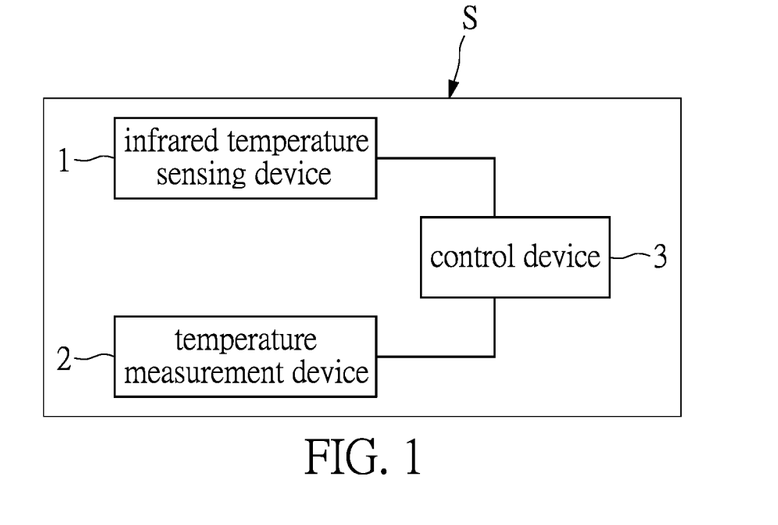
FIG. 1 is a functional block diagram of a temperature sensing system of an infrared thermal image camera of the present disclosure.
Figure 2:
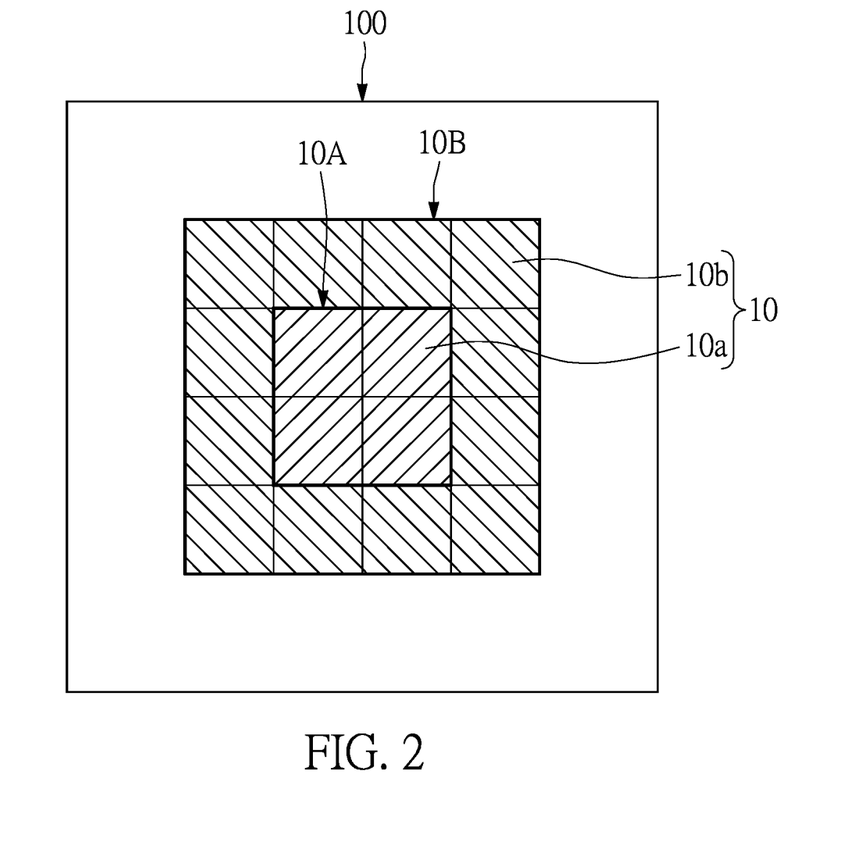
FIG. 2 is a top schematic view of an infrared temperature sensing device of the temperature sensing system of the infrared thermal image camera of the present disclosure.

References are made to FIG. 1 and FIG. 2. FIG. 1 is a functional block diagram of a temperature sensing system of an infrared thermal image camera of the present disclosure. FIG. 2 is a top schematic view of an infrared temperature sensing device of the temperature sensing system of the infrared thermal image camera of the present disclosure. The present disclosure provides a temperature calibration method of an infrared thermal image camera and a calibration method of a temperature sensing system S of the infrared thermal image camera. The temperature calibration method of the infrared thermal image camera and the calibration method of the temperature sensing system S of the infrared thermal image camera can be utilized on the infrared thermal image camera, but the present disclosure is not limited thereto. Moreover, it is worth mentioning that the first embodiment focuses on describing the temperature calibration method of the infrared thermal image camera, and the second embodiment focuses on describing the calibration method of the temperature sensing system S of the infrared thermal image camera. Furthermore, after the temperature sensing system S of the infrared thermal image camera has performed the calibration method of the temperature sensing system S of the infrared thermal image camera provided by the second embodiment of the present disclosure, the temperature sensing system S of the infrared thermal image camera can further utilize the temperature calibration method of the infrared thermal image camera provided by the first embodiment, such that the temperature sensing system S of the infrared thermal image camera can accurately obtain a temperature of an object under test (not shown in the figures).

The temperature sensing system S of the infrared thermal image camera includes an infrared temperature sensing device 1, a temperature measurement device 2, and a control device 3. The infrared temperature sensing device 1 and the temperature measurement device 2 are electrically connected to the control device 3, so as to utilize the control device 3 to calculate temperatures measured by the infrared temperature sensing device 1 and the temperature measurement device 2. Moreover, the infrared temperature sensing device 1 can include a plurality of infrared temperature sensors 10, and the plurality of infrared temperature sensors 10 are disposed on a substrate 100. Moreover, for ease of illustration, the infrared temperature sensing device 1 provided by the present disclosure is exemplified by the plurality of infrared temperature sensors 10 arranged in a 4×4 array. However, in other implementations, the infrared temperature sensing device 1 can be the plurality of infrared temperature sensors 10 arranged in a 32×32 array or a 320×240 array. That is to say, the infrared temperature sensing device 1 can be arranged in an R×L array, and both R and L are integers greater than 2. However, it should be noted that the present disclosure does not limit the quantity or the arrangement of the plurality of infrared temperature sensors 10. In addition, it is worth mentioning that, each of the plurality of infrared temperature sensors 10 can be a microbolometer, or an infrared thermometer, and the temperature measurement device 2 can be a thermocouple sensor or a thermistor sensor, but the present disclosure is not limited thereto. For the present disclosure, the temperature measurement device 2 can be utilized to measure the environment temperature, and the infrared temperature sensing device 1 can be utilized to measure the temperature of the object under test. Furthermore, for example, the control device 3 can be a microcontroller unit (MCU), which can process information measured by the plurality of infrared temperature sensors 10 and the temperature measurement device 2, but the present disclosure is not limited thereto.

Figure 3:
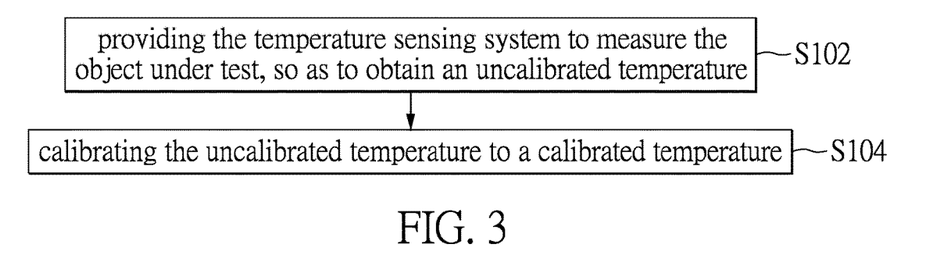
FIG. 3 is a flow chart of a temperature calibration method of the infrared thermal image camera in a first embodiment of the present disclosure.

Moreover, reference is made to FIG. 3, which is a flow chart of a temperature calibration method of the infrared thermal image camera in a first embodiment of the present disclosure. To be more specific, the temperature calibration method of the infrared thermal image camera includes the following steps. Step S102 includes providing the temperature sensing system S to measure the object under test, so as to obtain an uncalibrated temperature. For example, one of the plurality of infrared temperature sensors 10 of the infrared temperature sensing device 1 of the temperature sensing system S of the infrared thermal image camera can be utilized to measure the object under test to obtain the uncalibrated temperature. In addition, it is worth mentioning that description is made of an example in which the uncalibrated temperature of the present disclosure is obtained through one of the plurality of infrared temperature sensors 10 measuring the object under test. Uncalibrated temperatures are obtained by other ones of the plurality of infrared temperature sensors 10 through a similar method, and will not be reiterated herein.

Subsequently, step S104 includes calibrating the uncalibrated temperature to a calibrated temperature. For example, the uncalibrated temperature can be calibrated to the calibrated temperature according to the uncalibrated temperature and a temperature calibration function, and the temperature calibration function can be obtained through a regression analysis. For example, the temperature calibration function can be obtained through a nonlinear regression analysis, such as a polynomial regression analysis, but the present disclosure is not limited thereto. Moreover, for the present disclosure, the temperature calibration function can include the following relation: $T1_{obj}=(C1_0+C1_1 \times T1_{objN}+C1_2 \times (T1_{objN})^2+C1_3 \times (T1_{objN})^3+C1_4 \times (T1_{objN})^4+C1_5 \times (T1_{objN})^5)$. $T1_{obj}$ is the calibrated temperature of the object under test that is obtained through one of the plurality of infrared temperature sensors 10 (i.e., a first infrared temperature sensor 10a) measuring the object under test, and the calibrated temperature $T1_{obj}$ is in Celsius (° C.). $T1_{objN}$ is the uncalibrated temperature of the object under test that is obtained through one of the plurality of infrared temperature sensors 10 (i.e., the first infrared temperature sensor 10a) measuring the object under test, and the uncalibrated temperature $T1_{objN}$ of the temperature calibration function is in Celsius. $C1_0$ is a first temperature calibration regression coefficient, $C1_1$ is a second temperature calibration regression coefficient, $C1_2$ is a third temperature calibration regression coefficient, $C1_3$ is a fourth temperature calibration regression coefficient, $C1_4$ is a fifth temperature calibration regression coefficient, and $C1_5$ is a sixth temperature calibration regression coefficient. That is to say, the uncalibrated temperature of the object under test obtained through the afore-mentioned step S102 can be substituted into the afore-mentioned temperature calibration function, so as to obtain the calibrated temperature of the object under test. In other words, the afore-mentioned temperature calibration function can be utilized to calibrate each value that is respectively measured by each of the plurality of infrared temperature sensors 10.

It is worth mentioning that each of the plurality of infrared temperature sensors 10 may still have differences with respect to manufacturing or other parameters. Therefore, other ones of the plurality of infrared temperature sensors 10 can have corresponding temperature calibration functions, respectively. Further, a first temperature calibration regression coefficient $Cn_0$, a second temperature calibration regression coefficient $Cn_1$, a third temperature calibration regression coefficient $Cn_2$, a fourth temperature calibration regression coefficient $Cn_3$, a fifth temperature calibration regression coefficient $Cn_4$, and a sixth temperature calibration regression coefficient $Cn_5$ of the temperature calibration function of one of the other ones of the plurality of infrared temperature sensors 10 (i.e., a second infrared temperature sensor 10b, a third infrared temperature sensor, or a nth infrared temperature sensor, with n being a positive integer greater than 1) can still be different from the first temperature calibration regression coefficient $C1_0$, the second temperature calibration regression coefficient $C1_1$, the third temperature calibration regression coefficient $C1_2$, the fourth temperature calibration regression coefficient $C1_3$, the fifth temperature calibration regression coefficient $C1_4$, and the sixth temperature calibration regression coefficient $C1_5$ of the one of the plurality of infrared temperature sensors 10, which is mentioned above. Furthermore, the first temperature calibration regression coefficients ($C1_0$ to $Cn_0$), the second temperature calibration regression coefficients ($C1_1$ to $Cn_1$), the third temperature calibration regression coefficients ($C1_2$ to $Cn_2$), the fourth temperature calibration regression coefficients ($C1_3$ to $Cn_3$), the fifth temperature calibration regression coefficients ($C1_4$ to $Cn_4$), and the sixth temperature calibration regression coefficients ($C1_5$ to $Cn_5$) that are mentioned above can be stored in the temperature sensing system S, such as a calibration parameter table, and the calibration parameter table can be a lookup table. The control device 3 can utilize the calibration parameter table to obtain a corresponding value of at least one of the above-mentioned temperature calibration regression coefficients. In addition, a method of generating the abovementioned temperature calibration regression coefficients will be explained in the following embodiments. Furthermore, although the afore-mentioned implementations of the calibration regression coefficients are analyzed with a quantic equation, in other implementations, the calibration regression coefficients can be analyzed with a quartic equation, a sixth equation, or a seventh equation. In other words, in other implementations, the temperature calibration function of the nth infrared temperature sensor of the plurality of infrared temperature sensors 10 can be a Kth equation, which includes, for example, the following relation: $Tn_{obj}=(Cn_0+Cn_1 \times Tn_{objN}+Cn_2 \times (Tn_{objN})^2+Cn_3 \times (Tn_{objN})^3+Cn_4 \times (Tn_{objN})^4+ \ldots +Cn_K \times (Tn_{objN})^K)$. In addition, it is worth mentioning that the relation of the temperature calibration functions can be obtained from Wien Displacement Compensation.

Figure 4:
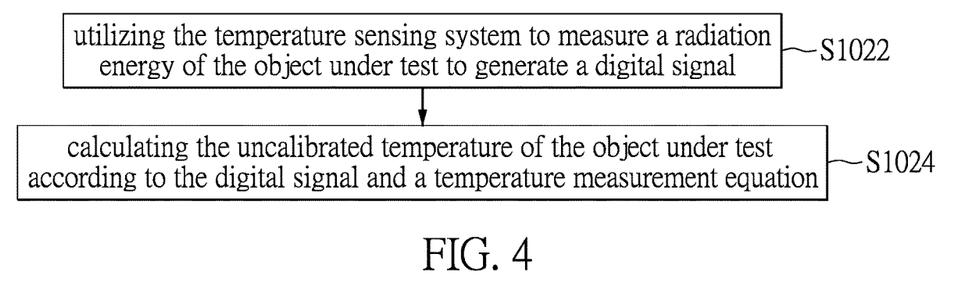
FIG. 4 is a flow chart of step S102 of the temperature calibration method of the infrared thermal image camera in the first embodiment of the present disclosure.

Moreover, reference is made to FIG. 4, which is a flow chart of step S102 of the temperature calibration method of the infrared thermal image camera in the first embodiment of the present disclosure. Step S102 of measuring the object under test to obtain the uncalibrated temperature includes the following steps. Step S1022 includes utilizing the temperature sensing system S to measure a radiation energy of the object under test to generate a digital signal. For example, the digital signal can be obtained through one of the plurality of infrared temperature sensors 10 of the infrared temperature sensing device 1 measuring the radiation energy of the object under test. In addition, the digital signal can be obtained through one of the plurality of infrared temperature sensors 10 measuring the radiation power of the object under test, converting a value of the measured radiation power into a voltage signal, amplifying the voltage signal through an operation amplifier, and then converting the amplified voltage signal into the digital signal through an analog-to-digital converter.

Subsequently, step S1024 includes calculating the uncalibrated temperature of the object under test according to the digital signal and a temperature measurement equation. For example, the control device 3 can receive digital signals measured by the plurality of infrared temperature sensors 10, and utilize the temperature measurement equation to calculate the uncalibrated temperature of the object under test. Moreover, for the present disclosure, the temperature measurement includes the following relation: $S1=G1\times(1+tCo1\times(T_{amb}-T_{de}))\times((T1_{objN})^4-(T_{amb})^4)$. S1 is the digital signal, G1 is a calibration coefficient, tCo1 is a system temperature coefficient, $T_{amb}$ is an environment temperature, the environment temperature is in Kelvin, $T1_{objN}$ is the uncalibrated temperature of the object under test, the uncalibrated temperature of the temperature measurement equation is in Kelvin, and $T_{de}$ has a temperature of 298.15K. Furthermore, it is worth mentioning that the environment temperature $T_{amb}$ can be measured by the temperature measurement device 2, and the digital signal can be measured by one of the plurality of infrared temperature sensors 10 of the infrared temperature sensing device 1. In addition, $T_{de}$ has a temperature of 298.15K, indicating that $T_{de}$ has a temperature of 25° C. Therefore, in step S1024, the digital signal and the temperature measurement equation can be utilized to calculate the uncalibrated temperature of the object under test. Afterwards, the temperature calibration function in step S104 can be utilized to substitute the uncalibrated temperature of the object under test into the afore-mentioned temperature calibration function, so as to obtain the calibrated temperature of the object under test. It is worth mentioning that the abovementioned temperature measurement equation can be obtained through the Stefan-Boltzmann law. In addition, it is worth mentioning that the system temperature coefficient tCo (the above-mentioned tCo1) is mainly obtained in two manners. The system temperature coefficient tCo is obtained from temperature coefficients of the plurality of infrared temperature sensors 10, respectively, or obtained from shifts on a transmission-wavelength spectrum under different room temperatures. More specifically, infrared beams having identical wavelengths under different room temperatures have different transmission due to the shifts on the transmission-wavelength spectrum. For example, when the room temperature is elevated from 15° C. to 55° C., a transmittance of an infrared beam having a wavelength of 4.2 μm decreases from approximately 95% to 90%.

It is worth mentioning that each of the plurality of infrared temperature sensors 10 may still have differences with respect to manufacturing or other parameters. Therefore, other ones of the plurality of infrared temperature sensors 10 can have corresponding temperature measurement equations, respectively. Further, the calibration coefficient Gn and the system temperature coefficient tCon of the temperature measurement equation of one of the other ones of the plurality of infrared temperature sensors 10 (i.e., a second infrared temperature sensor 10b, a third infrared temperature sensor, or a nth infrared temperature sensor, with n being a positive integer greater than 1) can still be different from the temperature measurement equation G1 and the system temperature coefficient tCo1 of the one of the plurality of infrared temperature sensors 10, as mentioned above. Furthermore, the calibration coefficients (G1 to Gn) and the system temperature coefficient (tCo1 to tCon) that are mentioned above can be stored in the temperature sensing system S, such as a calibration parameter table, and the calibration parameter table can be a lookup table. The control device 3 can utilize the calibration parameter table to obtain a corresponding value of the calibration coefficients (G1 to Gn) and the system temperature coefficient (tCo1 to tCon). In addition, a method of generating the calibration coefficients and the system temperature coefficients will be explained in the following embodiments.

Figure 5:
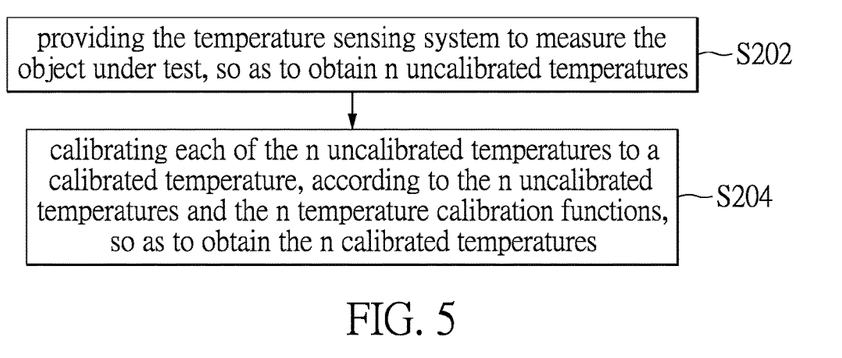
FIG. 5 is another flow chart of the temperature calibration method of the infrared thermal image camera in the first embodiment of the present disclosure.

Moreover, references are further made to FIG. 1 and FIG. 2, which are to be read in conjunction with FIG. 5. FIG. 5 is another flow chart of the temperature calibration method of the infrared thermal image camera in the first embodiment of the present disclosure. It should be noted that since the temperature sensing system S of the present disclosure is applied on an infrared thermal image camera, the infrared temperature sensing device 1 of the temperature sensing system S would have the plurality of infrared temperature sensors 10. However, since each of the plurality of infrared temperature sensors may still have differences with respect to manufacturing or other parameters, the other ones of the plurality of infrared temperature sensors 10 could still have the corresponding temperature calibration functions, respectively. The temperature calibration method of the plurality of infrared temperature sensors will be described in detail hereinafter.

The temperature calibration method includes the following steps. Step S202 includes providing the temperature sensing system S to measure the object under test, so as to obtain n uncalibrated temperatures. For example, the first infrared temperature sensor 10a of at least one first group 10A and/or the second infrared temperature sensor 10b of at least one second group 10B can be utilized to measure the object under test to obtain the n uncalibrated temperatures (i.e., the plurality of uncalibrated temperatures). The temperature sensing system S includes n infrared temperature sensors 10 (i.e., the plurality of infrared temperature sensors 10), the n infrared temperature sensors 10 are disposed in an array of R×L, and the n infrared temperature sensors 10 are disposed sequentially from the first infrared temperature sensor 10a to an nth infrared temperature sensor. R is a positive integer greater than or equal to 2, L is a positive integer greater than or equal to 2, n has a quantity of R multiplying L, and the n infrared temperature sensors 10 each measure the object under test to obtain the n uncalibrated temperatures, respectively.

Subsequently, step S204 includes calibrating each of the n uncalibrated temperatures to a calibrated temperature, according to the n uncalibrated temperatures and the n temperature calibration functions, so as to obtain the n calibrated temperatures, and the n temperature calibration functions are respectively obtained through a regression analysis. Moreover, each of the n uncalibrated temperatures respectively corresponds to one of the corresponding n temperature calibration functions, and each of the first infrared temperature sensor 10a to the nth infrared temperature sensor of the plurality of infrared temperature sensors 10 measures the object under test to obtain a corresponding first uncalibrated temperature to a corresponding nth uncalibrated temperature, respectively.

For the present disclosure, a first temperature calibration function of the n temperature calibration functions includes the following relation: $T1_{obj}=(C1_0+C1_1\times T1_{objN}+C1_2\times(T1_{objN})^2+C1_3\times(T1_{objN})^3+C1_4\times(T1_{objN})^4+C1_5\times(T1_{objN})^5)$.
$T1_{obj}$ is a first calibrated temperature obtained through the first infrared temperature sensor 10a measuring the object under test, and the first calibrated temperature of the first temperature calibration function is in Celsius. $T1_{objN}$ is the first uncalibrated temperature obtained through the first infrared temperature sensor $10a$ measuring the object under test, and the first uncalibrated temperature of the first temperature calibration function is in Celsius. $C1_0$ is a first temperature calibration regression coefficient of the first temperature calibration function, $C1_1$ is a second temperature calibration regression coefficient of the first temperature calibration function, $C1_2$ is a third temperature calibration regression coefficient of the first temperature calibration function, $C1_3$ is a fourth temperature calibration regression coefficient of the first temperature calibration function, $C1_4$ is a fifth temperature calibration regression coefficient of the first temperature calibration function, and $C1_5$ is a sixth temperature calibration regression coefficient of the first temperature calibration function. That is to say, the first uncalibrated temperature of the object under test obtained in the afore-mentioned step S202 can be substituted into the first temperature calibration function to obtain the first calibrated temperature of the object under test. In other words, the afore-mentioned first temperature calibration function can be utilized to calibrate a value of the first uncalibrated temperature that is measured by the first infrared temperature sensor $10a$.

Furthermore, a jth temperature calibration function of the n temperature calibration functions includes the following relation (in which j is a positive integer greater than 1 and less than n): $Tj_{obj} = (Cj_0 + Cj_1 \times Tj_{objN} + Cj_2 \times (Tj_{objN})^2 + Cj_3 \times (Tj_{objN})^3 + Cj_4 \times (Tj_{objN})^4 + Cj_5 \times (Tj_{objN})^5)$. $Tj_{obj}$ is a jth calibrated temperature obtained through a jth infrared temperature sensor of the plurality of infrared temperature sensors 10 measuring the object under test, and the jth calibrated temperature is in Celsius. $Tj_{objN}$ is a jth uncalibrated temperature obtained through the jth infrared temperature sensor of the plurality of infrared temperature sensors 10 measuring the object under test, and the jth uncalibrated temperature of the jth temperature calibration function is in Celsius. $Cj_0$ is a first temperature calibration regression coefficient of the jth temperature calibration function, $Cj_1$ is a second temperature calibration regression coefficient of the jth temperature calibration function, $Cj_2$ is a third temperature calibration regression coefficient of the jth temperature calibration function, $Cj_3$ is a fourth temperature calibration regression coefficient of the jth temperature calibration function, $Cj_4$ is a fifth temperature calibration regression coefficient of the jth temperature calibration function, and $Cj_5$ is a sixth temperature calibration regression coefficient of the jth temperature calibration function. That is to say, the jth uncalibrated temperature of the object under test obtained in the afore-mentioned step S202 can be substituted into the jth temperature calibration function to obtain the jth calibrated temperature of the object under test. In other words, the afore-mentioned jth temperature calibration function can be utilized to calibrate a value of jth first uncalibrated temperature that is measured by the jth infrared temperature sensor of the plurality of infrared temperature sensors 10.

Furthermore, a nth temperature calibration function includes the following relation: $Tn_{obj} = (Cn_0 + Cn_1 \times Tn_{objN} + Cn_2 \times (Tn_{objN})^2 + Cn_3 \times (Tn_{objN})^3 + Cn_4 \times (Tn_{objN})^4 + Cn_5 \times (Tn_{objN})^5)$; $Tn_{obj}$ is a nth calibrated temperature obtained through a nth infrared temperature sensor of the plurality of infrared temperature sensors 10 measuring the object under test, and the nth calibrated temperature is in Celsius. $Tn_{objN}$ is an nth uncalibrated temperature obtained through the nth infrared temperature sensor of the plurality of infrared temperature sensors 10 measuring the object under test, and the nth uncalibrated temperature of the nth temperature calibration function is in Celsius. $Cn_0$ is a first temperature calibration regression coefficient of the nth temperature calibration function, $Cn_1$ is a second temperature calibration regression coefficient of the nth temperature calibration function, $Cn_2$ is a third temperature calibration regression coefficient of the nth temperature calibration function, $Cn_3$ is a fourth temperature calibration regression coefficient of the nth temperature calibration function, $Cn_4$ is a fifth temperature calibration regression coefficient of the nth temperature calibration function, and $Cn_5$ is a sixth temperature calibration regression coefficient of the nth temperature calibration function. That is to say, the nth uncalibrated temperature of the object under test obtained in the afore-mentioned step S202 can be substituted into the nth temperature calibration function to obtain the nth calibrated temperature of the object under test. In other words, the afore-mentioned nth temperature calibration function can be utilized to calibrate a value of the nth first uncalibrated temperature that is measured by the nth infrared temperature sensor of the plurality of infrared temperature sensors 10.

Moreover, reference is made to FIG. 6, which is a flow chart of step S202 of the temperature calibration method of the infrared thermal image camera in the first embodiment of the present disclosure. Step S202 of measuring the object under test to obtain the n uncalibrated temperatures includes the following steps. Step S2022 includes utilizing the first infrared temperature sensor $10a$ to measure a radiation energy of a first predetermined position of the object under test to generate a first digital signal, utilizing the jth infrared temperature sensor of the plurality of infrared temperature sensors 10 to measure a radiation energy of a jth predetermined position of the object under test to generate a jth digital signal, and utilizing the nth infrared temperature sensor of the plurality of infrared temperature sensors 10 to measure a radiation energy of an nth predetermined position of the object under test to generate an nth digital signal.

Subsequently, step S2024 includes calculating the first uncalibrated temperature of the object under test according to the first digital signal and the first temperature measurement equation, calculating the jth uncalibrated temperature of the object under test according to the jth digital signal and the jth temperature measurement equation, and calculating the nth uncalibrated temperature of the object under test according to the nth digital signal and the nth temperature measurement equation. For example, the control device 3 can receive the first digital signal measured by the first infrared temperature sensor $10a$, the jth digital signal measured by the jth infrared temperature sensors 10 of the plurality of infrared temperature sensors 10, and the nth digital signal measured by the nth infrared temperature sensors 10 of the plurality of infrared temperature sensors 10, and utilize the first temperature measurement equation, the jth temperature measurement equation, and the nth temperature measurement equation to calculate the first uncalibrated temperature, the jth uncalibrated temperature, and the nth uncalibrated temperature of the object under test, respectively. Moreover, for the present disclosure, the first temperature measurement equation includes the following relation: $S1 = G1 \times (1 + tCo1 \times (T_{amb} - T_{de})) \times ((T1_{objN})^4 - (T_{amb})^4)$. In addition, the jth temperature measurement equation includes the following relation: $Sj = Gj \times (1 + tCoj \times (T_{amb} - T_{de})) \times ((T_{jobjN})^4 - (T_{amb})^4)$. In addition, the nth temperature measurement equation includes the following relation: $Sn = Gn \times (1 + tCon \times (T_{amb} - T_{de})) \times ((Tn_{objN})^4 - (T_{amb})^4)$. S1 is the first digital signal, Sj is the jth digital signal, and Sn is the nth digital signal. G1 is a calibration coefficient of the first temperature measurement equation, Gj is a calibration coefficient of the jth temperature measurement equation, and Gn is a calibration coefficient of the nth temperature measurement equation. tCo1 is a system temperature coefficient of the first temperature measurement equation, tCoj is a system temperature coefficient of the jth temperature measurement equation, and tCon is a system temperature coefficient of the nth temperature measurement equation. $T_{amb}$ is an environment temperature, and the environment temperature is in Kelvin. $T_{de}$ has a temperature of 298.15K. $T1_{objN}$ is the first uncalibrated temperature of the object under test, and the first uncalibrated temperature of the firth temperature measurement equation is in Kelvin. $Tj_{objN}$ is the jth uncalibrated temperature of the object under test, and the jth uncalibrated temperature of the jth temperature measurement equation is in Kelvin. $Tn_{objN}$ is the nth uncalibrated temperature of the object under test, and the nth uncalibrated temperature of the nth temperature measurement equation is in Kelvin.

It is worth mentioning that the environment temperature $T_{amb}$ can be measured by the temperature measurement device 2. In addition, the first digital signal S1 can be measured by the first infrared temperature sensor 10a, the jth digital signal Sj can be measured by the jth infrared temperature sensor of the plurality of infrared temperature sensors 10, and the nth digital signal Sn can be measured by the nth infrared temperature sensor of the plurality of infrared temperature sensors 10. In addition, $T_{de}$ has a temperature of 298.15K, indicating that $T_{de}$ has a temperature of 25° C. Therefore, in step S2024, the first digital signal, the jth digital signal, the nth digital signal, the first temperature measurement equation, the jth temperature measurement equation, and nth first temperature measurement equation can be utilized to calculate the first uncalibrated temperature, the jth uncalibrated temperature, and the nth uncalibrated temperature of the object under test. Afterwards, the first uncalibrated temperature, the jth uncalibrated temperature, and the nth uncalibrated temperature of the object under test can be respectively substituted into the first temperature calibration function, the jth temperature calibration function, and the nth temperature calibration function in step S204, so as to obtain the first calibrated temperature, the jth calibrated temperature, and the nth calibrated temperature of the object under test. In addition, it is worth mentioning that the first temperature measurement equation, the jth temperature measurement equation, and the nth temperature measurement equation that are mentioned above can be obtained through the Stefan-Boltzmann law. In addition, it is worth mentioning that the system temperature coefficient tCo (the above-mentioned tCo1, tCoj, and tCon) is mainly obtained in two manners. The system temperature coefficient tCo is obtained from temperature coefficients of the plurality of infrared temperature sensors 10, respectively, or obtained from the shifts on the transmission-wavelength spectrum under different room temperatures. More specifically, infrared beams having identical wavelengths under different room temperatures have different transmission due to the shifts on the transmission-wavelength spectrum. For example, when the room temperature is elevated from 15° C. to 55° C., a transmittance of an infrared beam having a wavelength of 4.2 μm decreases from approximately 95% to 90%.

Moreover, reference is made to FIG. 7, which is yet another flow chart of the temperature calibration method of the infrared thermal image camera in the first embodiment of the present disclosure. For exemplary purposes, the temperature calibration method of two of the plurality of infrared temperature sensors 10 (the first infrared temperature sensor 10a and the second infrared temperature sensor 10b) will be described below. Moreover, in the present disclosure, the first infrared temperature sensor 10a and the second infrared temperature sensor 10b respectively utilize the first temperature calibration function and the second temperature calibration function to conduct temperature measurement and calibration. However, in other implementations, a group (such as the first group 10A) composed of a plurality of first infrared temperature sensors 10a can utilize the first temperature calibration function to conduct temperature measurement and calibration, and a group (such as the second group 10B) composed of a plurality of second infrared temperature sensors 10b can utilize the second temperature calibration function to conduct temperature measurement and calibration.

The temperature calibration method includes the following steps. Step S302 includes providing a temperature sensing system S to measure an object under test to obtain a first uncalibrated temperature and a second uncalibrated temperature. For example, the plurality of first infrared temperature sensors 10a of the first group 10A can be utilized to measure the object under test to obtain the first uncalibrated temperature, and the plurality of second infrared temperature sensors 10b of the second group 10B can be utilized to measure the object under test to obtain the second uncalibrated temperature.

Subsequently, step S304 includes calibrating the first uncalibrated temperature to a first calibrated temperature, and calibrating the second uncalibrated temperature to a second calibrated temperature. For example, the first uncalibrated temperature can be calibrated to the first calibrated temperature according to the first uncalibrated temperature and the first temperature calibration function, and the second uncalibrated temperature can be calibrated to the second calibrated temperature according to the second uncalibrated temperature and the second temperature calibration function. Both the first temperature calibration function and the second temperature calibration function can be obtained through a regression analysis. Moreover, for the present disclosure, the first temperature calibration function can include the following relation: $T1_{obj}=(C1_0+C1_1 \times T1_{objN}+C1_2 \times (T1_{objN})^2+C1_3 \times (T1_{objN})^3+C1_4 \times (T1_{objN})^4+C1_5 \times (T1_{objN})^5)$. $T1_{obj}$ is the first calibrated temperature obtained through the first infrared temperature sensor 10a measuring the object under test, and the first calibrated temperature of the first temperature calibration function is in Celsius. $T1_{objN}$ is the first uncalibrated temperature obtained through the first infrared temperature sensor 10a measuring the object under test, and the first uncalibrated temperature of the first temperature calibration function is in Celsius. $C1_0$ is the first temperature calibration regression coefficient of the first temperature calibration function, $C1_1$ is the second temperature calibration regression coefficient of the first temperature calibration function, $C1_2$ is the third temperature calibration regression coefficient of the first temperature calibration function, $C1_3$ is the fourth temperature calibration regression coefficient of the first temperature calibration function, $C1_4$ is the fifth temperature calibration regression coefficient of the first temperature calibration function, and $C1_5$ is the sixth temperature calibration regression coefficient of the first temperature calibration function. That is to say, the first uncalibrated temperature of the object under test obtained in the afore-mentioned step S302 can be substituted into the first temperature calibration function to obtain the first calibrated temperature of the object under test. In other words, the afore-mentioned first temperature calibration function can be utilized to calibrate a value of the first uncalibrated temperature that is measured by the plurality of first infrared temperature sensors 10a.

Furthermore, for the present disclosure, the second temperature calibration function can include the following relation: $T2_{obj}=(C2_0+C2_1\times T2_{objN}+C2_2\times(T2_{objN})^2+C2_3\times(T2_{objN})^3+C2_4\times(T2_{objN})^4+C2_5\times(T2_{objN})^5)$. $T2_{obj}$ is the second calibrated temperature obtained through the second infrared temperature sensor 10b measuring the object under test, and the second calibrated temperature of the second temperature calibration function is in Celsius. $T2_{objN}$ is the second uncalibrated temperature obtained through the second infrared temperature sensor 10a measuring the object under test, and the second uncalibrated temperature of the second temperature calibration function is in Celsius. $C2_0$ is the first temperature calibration regression coefficient of the second temperature calibration function, $C2_1$ is the second temperature calibration regression coefficient of the second temperature calibration function, $C2_2$ is the third temperature calibration regression coefficient of the second temperature calibration function, $C2_3$ is the fourth temperature calibration regression coefficient of the second temperature calibration function, $C2_4$ is the fifth temperature calibration regression coefficient of the second temperature calibration function, and $C2_5$ is the sixth temperature calibration regression coefficient of the second temperature calibration function. That is to say, the second uncalibrated temperature of the object under test obtained in the afore-mentioned step S302 can be substituted into the second temperature calibration function to obtain the second calibrated temperature of the object under test. In other words, the afore-mentioned second temperature calibration function can be utilized to calibrate a value of the second uncalibrated temperature that is measured by the plurality of second infrared temperature sensors 10b.

Figure 8:
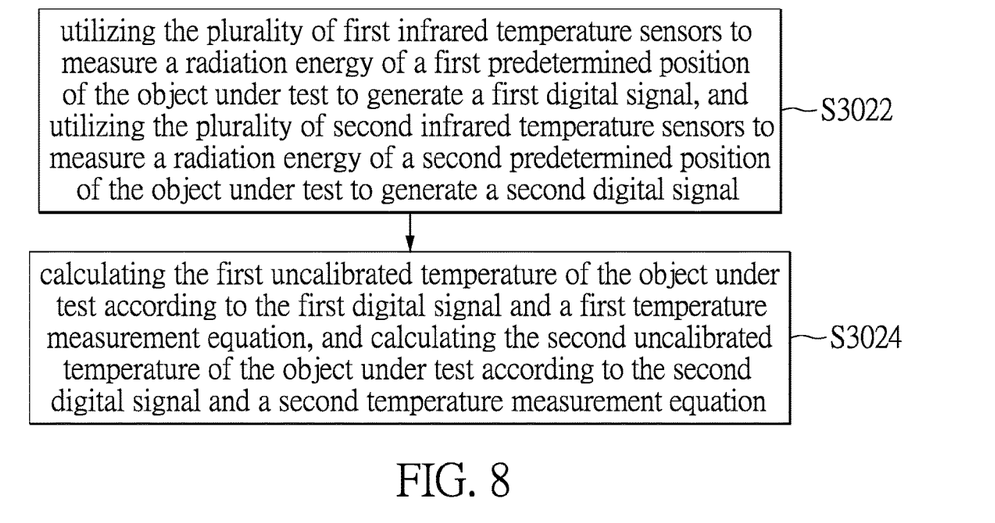
FIG. 8 is a flow chart of step S302 of the temperature calibration method of the infrared thermal image camera in the first embodiment of the present disclosure.

Reference is made to FIG. 8, which is a flow chart of step S302 of the temperature calibration method of the infrared thermal image camera in the first embodiment of the present disclosure. Step S302 of measuring the object under test to obtain the first uncalibrated temperature and the second uncalibrated temperature includes the following steps. Step S3022 includes utilizing the plurality of first infrared temperature sensors 10a to measure a radiation energy of a first predetermined position of the object under test to generate a first digital signal, and utilizing the plurality of second infrared temperature sensors 10b to measure a radiation energy of a second predetermined position of the object under test to generate a second digital signal. For example, the first digital signal and the second digital signal can be signals respectively generated through one of the plurality of first infrared temperature sensors 10a and one of the plurality of second infrared temperature sensors 10b of the infrared temperature sensing device 1 measuring the radiation energy of the object under test, respectively.

Subsequently, step S3024 includes calculating the first uncalibrated temperature of the object under test according to the first digital signal and a first temperature measurement equation, and calculating the second uncalibrated temperature of the object under test according to the second digital signal and a second temperature measurement equation. For example, the control device 3 can receive the first digital signal measured by the first infrared temperature sensor 10a and the second digital signal measured by the second infrared temperature sensor 10b, and utilize the first temperature measurement equation and the second temperature measurement equation to calculate the first uncalibrated temperature and the second uncalibrated temperature of the object under test, respectively. Moreover, for the present disclosure, the first temperature measurement includes the following relation: $S1=G1\times(1+tCo1\times(T_{amb}-T_{de}))\times((T1_{objN})^4-(T_{amb})^4)$, and the second temperature measurement includes the following relation: $S2=G2\times(1+tCo2\times(T_{amb}-T_{de}))\times((T2_{objN})^4-(T_{amb})^4)$. S1 is the first digital signal, and S2 is the second digital signal. G1 is a calibration coefficient of the first temperature measurement equation, and G2 is a calibration coefficient of the second temperature measurement equation. tCo1 is a system temperature coefficient of the first temperature measurement equation, and tCo2 is a system temperature coefficient of the second temperature measurement equation. $T_{amb}$ is an environment temperature, and the environment temperature is in Kelvin. $T_{de}$ has a temperature of 298.15K. $T1_{objN}$ is the first uncalibrated temperature of the object under test, $T2_{objN}$ is the second uncalibrated temperature of the object under test, the first uncalibrated temperature $T1_{objN}$ of the first temperature measurement equation is in Kelvin, and the second uncalibrated temperature $T2_{objN}$ of the second temperature measurement equation is in Kelvin. Therefore, in step S3024, the first digital signal, the second digital signal, the first temperature measurement equation, and the second temperature measurement equation can be utilized to calculate the first uncalibrated temperature and the second uncalibrated temperature of the object under test. Afterwards, the first uncalibrated temperature and the second uncalibrated temperature of the object under test can be respectively substituted into the first temperature calibration function and the second temperature calibration function in step S304, so as to obtain the first calibrated temperature and the second calibrated temperature of the object under test. Furthermore, it should be noted that, although the above is described with reference to the plurality of first infrared temperature sensors 10a and the plurality of second temperature sensors 10b, methods of the other ones of the plurality of infrared temperature sensors 10 obtaining calibrated temperatures are similar to the foregoing description, which will not be reiterated herein. In addition, it is worth mentioning that the first temperature measurement equation and the second temperature measurement equation that are mentioned above can be obtained through the Stefan-Boltzmann law. In addition, it is worth mentioning that the system temperature coefficient tCo (the above-mentioned tCo1 and tCo2) is mainly obtained in two manners. The system temperature coefficient tCo is obtained from temperature coefficients of the plurality of infrared temperature sensors 10, respectively, or obtained from the shifts on the transmission-wavelength spectrum under different room temperatures. More specifically, infrared beams having identical wavelengths under different room temperatures have different transmission due to the shifts on the transmission-wavelength spectrum. For example, when the room temperature is elevated from 15° C. to 55° C., a transmittance of an infrared beam having a wavelength of 4.2 μm decreases from approximately 95% to 90%.

Second Embodiment

Figure 9:
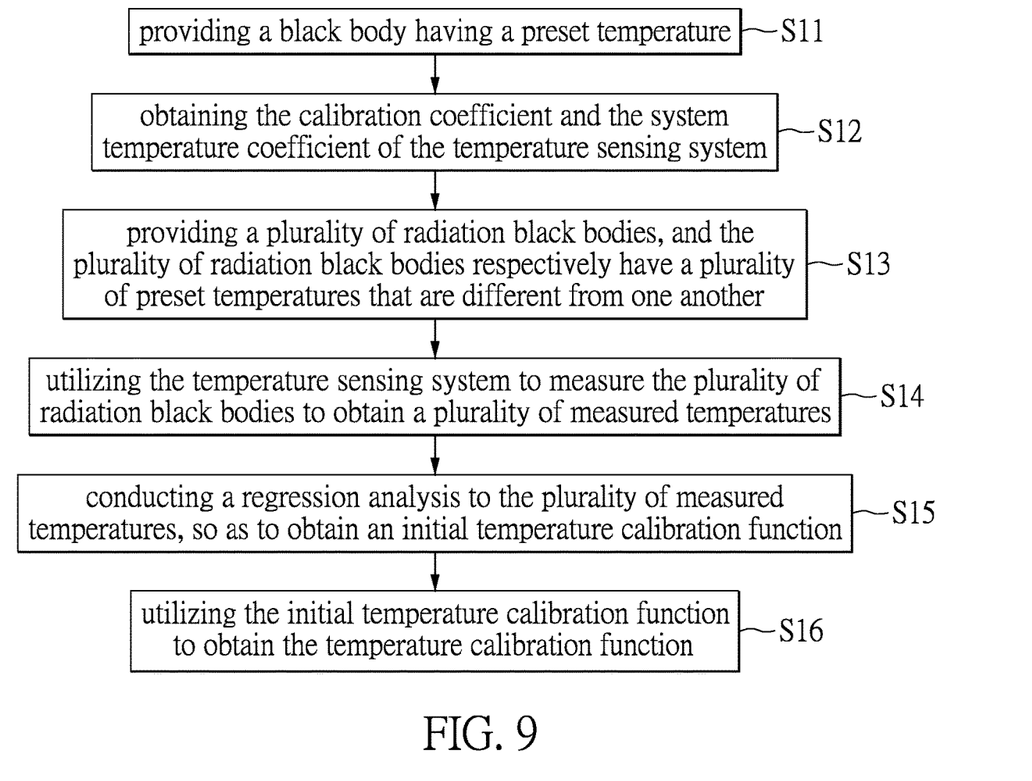
FIG. 9 is a flow chart of a calibration method of a temperature sensing system of an infrared thermal image camera in a second embodiment of the present disclosure.
Figure 10:
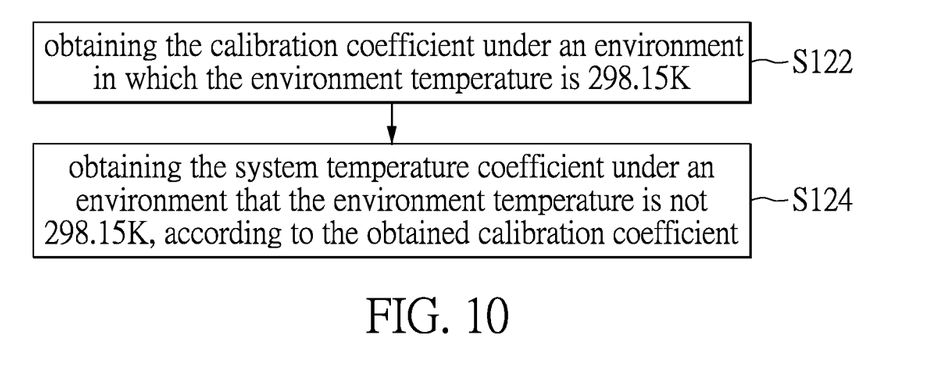
FIG. 10 is a flow chart of step S12 of the calibration method of the temperature sensing system of the infrared thermal image camera in the second embodiment of the present disclosure.

References are made to FIG. 9 and FIG. 10. FIG. 9 is a flow chart of a calibration method of a temperature sensing system of an infrared thermal image camera in a second embodiment of the present disclosure. FIG. 10 is a flow chart of step S12 of the calibration method of the temperature sensing system of the infrared thermal image camera in the second embodiment of the present disclosure. A calibration method of a temperature sensing system S will be explained as follows, and the method of generating the afore-mentioned calibration regression coefficients, calibration coefficients, and the system temperature coefficients will be further explained as follows. For the present disclosure, values of the first temperature calibration regression coefficient, the second temperature calibration regression coefficient, the third temperature calibration regression coefficient, the fourth temperature calibration regression coefficient, the fifth temperature calibration regression coefficient, the sixth temperature calibration regression coefficient, the calibration coefficient, and the system temperature coefficient are all generated through a calibration process of the temperature sensing system.

The calibration method of the temperature sensing system S includes the following steps. Step S1i includes providing a black body having a preset temperature. For example, the preset temperature of the black body can be known, so as to calculate the calibration coefficient and the system temperature coefficient. Subsequently, step S12 includes obtaining the calibration coefficient G1 and the system temperature coefficient Co1 of the temperature sensing system S. For example, in a step of obtaining the calibration coefficient and the system temperature coefficient, an initial temperature measurement equation is utilized to obtain the calibration coefficient and the system temperature coefficient, and the initial temperature measurement equation includes the following relation: $S1=G1\times(1+tCo1\times(T_{amb}-T_{de}))\times((T1_{objNA})^4-(T_{amb})^4)$. S is an initial digital signal that is obtained through the temperature sensing system S measuring the black body. G1 is the calibration coefficient. tCo1 is the system temperature coefficient. $T_{amb}$ is the environment temperature, which can be obtained through utilizing the temperature sensing device 2 of the temperature sensing system S to measure a temperature of the environment, and the environment temperature $T_{amb}$ is in Kelvin. $T_{de}$ has a temperature of 298.15K. $T1_{objNA}$ is the preset temperature of the black body, and the preset temperature is in Kelvin. For example, the preset temperature of the black body can be 100° C., i.e., 373.15K. In addition, it is worth mentioning that the afore-mentioned initial temperature measurement equation can be obtained through the Stefan-Boltzmann law. In addition, it is worth mentioning that the system temperature coefficient tCo (the above-mentioned tCo1) is mainly obtained in two manners. The system temperature coefficient tCo is obtained from temperature coefficients of the plurality of infrared temperature sensors 10, respectively, or obtained from shifts on a transmission-wavelength spectrum under different room temperatures. More specifically, infrared beams having identical wavelengths under different room temperatures have different transmission due to the shifts on the transmission-wavelength spectrum. For example, when the room temperature is elevated from 15° C. to 55° C., a transmittance of an infrared beam having a wavelength of 4.2 μm decreases from approximately 95% to 90%.

The following steps are included in the step of obtaining the calibration coefficient and the system temperature coefficient. Step S122 includes obtaining the calibration coefficient under an environment in which the environment temperature $T_{amb}$ is 298.15K. In other words, when the environment temperature is 298.15K, the calibration coefficient G1 can be calculated through utilizing the initial temperature measurement equation. Subsequently, step S124 includes obtaining the system temperature coefficient tCo1 under an environment that the environment temperature $T_{amb}$ is not 298.15K, according to the obtained calibration coefficient G1. In other words, since the calibration coefficient G1 can be obtained in step S122, the system temperature coefficient tCo1 can be further calculated through the initial temperature measurement equation. In addition, it should be noted that, in step S11 and step S12, the compensation of Wien's displacement law is not taken into consideration. Therefore, proceeding with the following step S13, step S14, step S15, and step S16 is still required.

Subsequently, step S13 includes providing a plurality of radiation black bodies, and the plurality of radiation black bodies respectively have a plurality of preset temperatures that are different from one another. For example, the preset temperatures of the plurality of black bodies are known, so as to calculate the temperature calibration regression coefficient. Moreover, each of the preset temperatures of the plurality of black bodies is in Celsius. Subsequently, step S14 includes utilizing the temperature sensing system S to measure the plurality of radiation black bodies to obtain a plurality of measured temperatures. For example, the plurality of infrared temperature sensors 10 of the temperature sensing system S can be utilized to directly measure the plurality of radiation black bodies. In addition, each of the plurality of measured temperatures is in Celsius. Furthermore, the preset temperatures of the plurality of black bodies as mentioned above are the actual temperatures of the plurality of black bodies, and the plurality of measured temperatures are temperatures that are measured by utilizing the temperature sensing system S. Therefore, there may still be deviations between the actual temperatures and the measured temperatures, for which calibrations are required.

For example, in step S13, a first radiation black body having a first predetermined temperature, a second radiation black body having a second predetermined temperature, a third radiation black body having a third predetermined temperature, a fourth radiation black body having a fourth predetermined temperature, a fifth radiation black body having a fifth predetermined temperature, and a sixth radiation black body having a sixth predetermined temperature can be provided. In addition, the first predetermined temperature, the second predetermined temperature, the third predetermined temperature, the fourth predetermined temperature, the fifth predetermined temperature, and the sixth predetermined temperature are not the same as one another. In addition, each of the first predetermined temperature, the second predetermined temperature, the third predetermined temperature, the fourth predetermined temperature, the fifth predetermined temperature, and the sixth predetermined temperature is in Celsius. However, it should be noted that the present disclosure does not limit a quantity of the abovementioned plurality of radiation bodies.

For example, in step S14, each of the plurality of infrared temperature sensors 10 of the temperature sensing system S can be utilized to measure the first radiation black body, the second radiation black body, the third radiation black body, the fourth radiation black body, the fifth radiation black body, and the sixth radiation black body, so as to obtain a first measured temperature, a second measured temperature, a third measured temperature, a fourth measured temperature, a fifth measured temperature, and a sixth measured temperature, respectively. Each of the first measured temperature, the second measured temperature, the third measured temperature, the fourth measured temperature, the fifth measured temperature, and the sixth measured temperature is in Celsius. In one of the implementations, since the calibration coefficient G1 and the system temperature coefficient tCo1 are obtained in the afore-mentioned step S1i and step S12, the plurality of measured temperatures can be obtained directly through the temperature measurement equation: $S=G1\times(1+tCo1\times(T_{amb}-T_{de}))\times((T_{objNR})^4-(T_{amb})^4)$. $T_{objNR}$ is the plurality of measured temperatures (e.g., the first measured temperature, the second measured temperature, the third measured temperature, the fourth measured temperature, the fifth measured temperature, and the sixth measured temperature). Furthermore, it is worth mentioning that the plurality of measured temperatures obtained through utilizing the temperature measurement equation have units of Kelvin. As such, converting a Kelvin temperature to a Celsius temperature is required, so as to further utilize step S15 to obtain the temperature calibration regression coefficient.

Referring to Table 1 below, the first measured temperature corresponds to the first predetermined temperature, the second measured temperature corresponds to the second predetermined temperature, the third measured temperature corresponds to the third predetermined temperature, the fourth measured temperature corresponds to the fourth predetermined temperature, the fifth measured temperature corresponds to the fifth predetermined temperature, and the sixth measured temperature corresponds to the sixth predetermined temperature.

For example, the first measured temperature can be 346.42° C., the second measured temperature can be 300.59° C., the third measured temperature can be 181.57° C., the fourth measured temperature can be 100° C., the fifth measured temperature can be −3.5° C., and the sixth measured temperature can be −41.28° C. In addition, the first predetermined temperature can be 500° C., the second predetermined temperature can be 400° C., the third predetermined temperature can be 200° C., the fourth predetermined temperature can be 100° C., the fifth predetermined temperature can be 0° C., and the sixth predetermined temperature can be −30° C. However, it should be noted that the plurality of measured temperatures and the plurality of predetermined temperatures as mentioned above are merely examples, and the present disclosure is not limited thereto.

Subsequently, step S15 includes conducting a regression analysis to the plurality of measured temperatures, so as to obtain an initial temperature calibration function. For the present disclosure, the initial temperature calibration function includes the following relation: $T_{obj}=(C1_0+C1_1 \times T_{objNB}+C1_2\times(T_{objNB})^2+C1_3\times(T_{objNB})^3+C1_4\times(T_{objNB})^4+C1_5\times(T_{objNB})^5)$. $C1_0$, $C1_1$, $C1_2$, $C1_3$, $C1_4$, and $C1_5$ are each a temperature calibration regression coefficient. In addition, in a step of obtaining the initial temperature calibration function, values of each of the plurality of predetermined temperatures are sequentially substituted into $T_{obj}$, values of each of the plurality of measured temperatures are sequentially substituted into $T_{objNB}$, and then the regression analysis is proceeded to obtain the plurality of temperature calibration regression coefficients. Moreover, it should be noted that the plurality of predetermined temperatures and the plurality of measured temperatures have units of Celsius.

For example, values of each of the first predetermined temperature, the second predetermined temperature, the third predetermined temperature, the fourth predetermined temperature, the fifth predetermined temperature, and the sixth predetermined temperature can be sequentially substituted into $T_{obj}$, and values of each of the first measured temperature, the second measured temperature, the third measured temperature, the fourth measured temperature, the fifth measured temperature, and the sixth measured temperature are sequentially substituted into $T_{objNB}$, and then the regression analysis is proceeded to obtain the first temperature calibration regression coefficient $C1_0$, the second temperature calibration regression coefficient $C1_1$, the third temperature calibration regression coefficient $C1_2$, the fourth temperature calibration regression coefficient $C1_3$, the fifth temperature calibration regression coefficient $C1_4$, and the sixth temperature calibration regression coefficient $C1_5$. For example, in one of the implementations, a spreadsheet software (such as Excel) can be used to conduct the regression analysis to obtain the first temperature calibration regression coefficient $C1_0$, the second temperature calibration regression coefficient $C1_1$, the third temperature calibration regression coefficient $C1_2$, the fourth temperature calibration regression coefficient $C1_3$, the fifth temperature calibration regression coefficient $C1_4$, and the sixth temperature calibration regression coefficient $C1_5$.

Subsequently, step S16 includes utilizing the initial temperature calibration function to obtain the temperature calibration function. For example, the temperature calibration function includes the following relation: $T1_{obj}=(C1_0+C1_1\times T1_{objN}+C1_2\times(T1_{objN})^2+C1_3\times(T1_{objN})^3+C1_4\times(T1_{objN})^4+C1_5\times(T1_{objN})^5)$. $T1_{obj}$ is a calibrated temperature of an object under test, the calibrated temperature is in Celsius, $T1_{objN}$ is an uncalibrated temperature of the object under test, the uncalibrated temperature of the temperature calibration function is in Celsius, and $C1_0$, $C1_1$, $C1_2$, $C1_3$, $C1_4$, and $C1_5$ are each one of the plurality of temperature calibration regression coefficients. In other words, the plurality of temperature calibration regression coefficients obtained through the afore-mentioned initial temperature calibration function can be utilized to obtain the temperature calibration function of the temperature calibration method provided in the first embodiment.

Moreover, it is worth mentioning that the abovementioned temperature calibration regression coefficient is merely one of the temperature calibration regression coefficients of one of the plurality of infrared temperature sensors 10. The respective temperature calibration regression coefficients of other ones of the plurality of infrared temperature sensors 10 (e.g., the first infrared sensor 10a to the nth infrared sensor of the plurality of infrared temperature sensors 10) can also be calculated through the abovementioned method, and will not be reiterated herein. Furthermore, it should be noted that although the abovementioned implementations of the temperature calibration regression coefficients are analyzed with a quantic equation, in other implementations, the temperature calibration regression coefficients can be analyzed with a cubic equation, a quartic equation, a sixth equation, or a seventh equation. In other words, in other implementations, the temperature calibration function can include, for example, the following relations: $T1_{obj}=(C1_0+C1_1\times T1_{objN}+C1_2\times(T1_{objN})^2+C1_3\times(T1_{objN})^3)$, $T1_{obj}=(C1_0+C1_1\times T1_{objN}+C1_2\times(T1_{objN})^2+C1_3\times(T1_{objN})^3+C1_4\times(T1_{objN})^4)$, $T1_{obj}=(C1_0+C1_1\times T1_{objN}+C1_2\times(T1_{objN})^2+C1_3\times(T1_{objN})^3+C1_4\times(T1_{objN})^4+C1_5\times(T1_{objN})^5+C1_6\times(T1_{objN})^6)$, or $T1_{obj}=(C1_0+C1_1\times T1_{objN}+C1_2\times(T1_{objN})^2+C1_3\times(T1_{objN})^3+C1_4\times(T1_{objN})^4+C1_5\times(T1_{objN})^5+C1_6\times(T1_{objN})^6+C1_7\times(T1_{objN})^7)$, and the present disclosure does not limit the power of the temperature calibration function.

TABLE 1

| Measured temperature (° C.) | Predetermined temperature (° C.) | Temperature calibration regression coefficient |
|---|---|---|
| −41.28 | −30 | $C_{15}$: $-1.27613 \times 10^{-11}$ |
| −3.5 | 0 | $C_{14}$: $1.27168 \times 10^{-8}$ |
| 100 | 100 | $C_{13}$: $-1.53674 \times 10^{-6}$ |
| 181.57 | 200 | $C_{12}$: $0.001217651$ |
| 300.59 | 400 | $C_{11}$: $0.852474723$ |
| 346.42 | 500 | $C_{10}$: $2.968677498$ |

Therefore, in one of the implementations, manufacturers can utilize the abovementioned calibration method of the temperature sensing system S to obtain a temperature calibration function, and store the temperature calibration function in the control device 3 of the temperature sensing system S. When a user is using the temperature sensing system S, the temperature sensing system S can be utilized to measure the object under test and utilize the temperature calibration function to obtain an accurate temperature of the object under test.

Furthermore, it should be noted that the n infrared temperature sensors 10 of the temperature sensing system S measure a plurality of infrared beams emitted by the object under test to obtain the n uncalibrated temperatures, each of the plurality of infrared beams has a corresponding incident angle. The plurality of infrared beams measured by j of the n infrared temperature sensors have identical incident angles to one another, the j of the n infrared temperature sensors 10 have identical temperature calibration regression coefficients to one another, and j is an integer greater than 1 and less than n.

Figure 11:
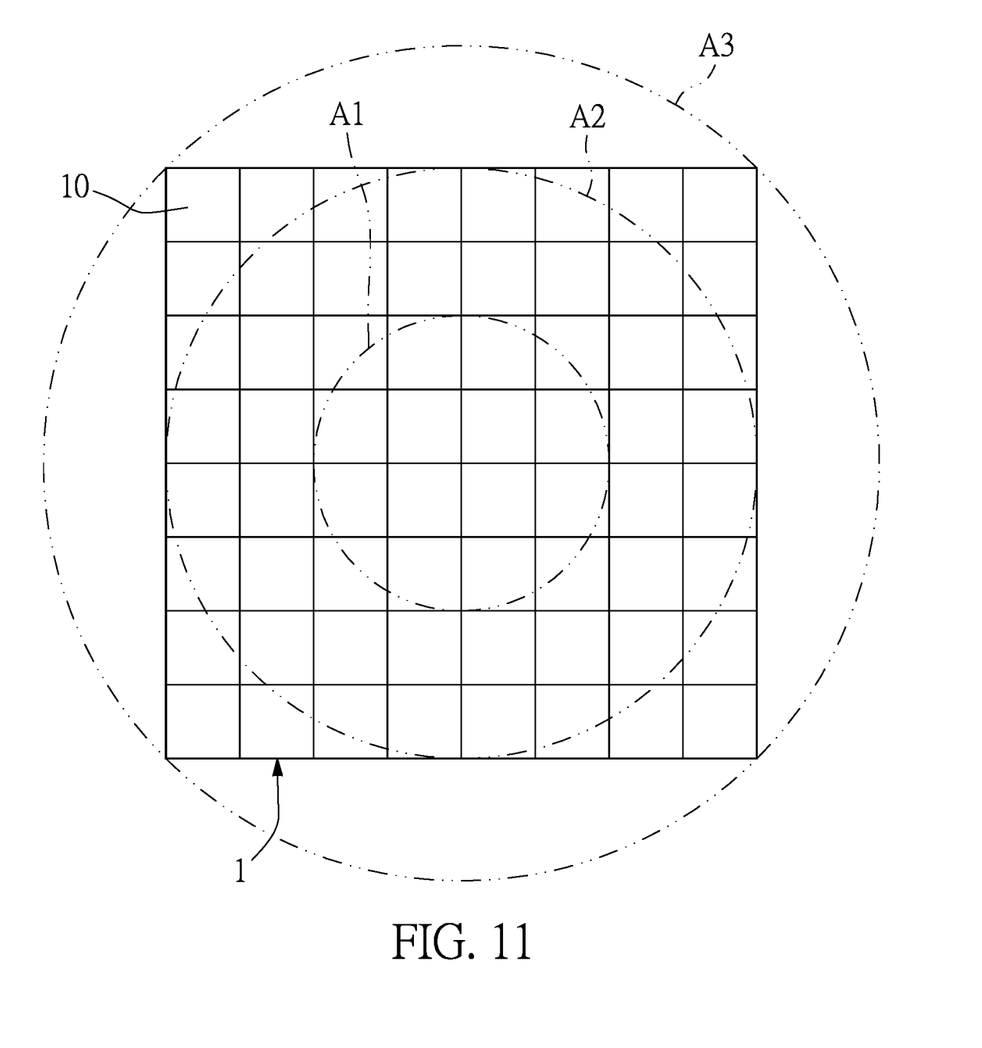
FIG. 11 is a schematic view showing area ranges of the temperature sensing system in the second embodiment of the present disclosure.

Specifically, reference is made to FIG. 11, the n infrared temperature sensors 10 can measure the plurality of infrared beams emitted by the object under test. For example, when the object under test is a human body, since the plurality of infrared beams emitted by the human body is definitely emitting from the human body to the external environment, each of the plurality of infrared beams emitted by the human body that is received by the n infrared temperature sensors 10 of the temperature sensing system S will definitely have a corresponding incident angle as well. In addition, the incident angles can different from or identical to one another. Among the n infrared temperature sensors 10 that receive the plurality of infrared beams, when k of the n infrared temperature sensors 10 sense that the plurality of infrared beams have the incident angles that are identical to one another, then the same temperature calibration regression coefficients (C0 to C5) can be applied with j of the n infrared temperature sensors 10.

Therefore, as shown in FIG. 11, a part of the n infrared temperature sensors within an area range of A1 have identical incident angles. Another part of the n infrared temperature sensors 10 within an area range of A2 have identical incident angles. Yet another part of the n infrared temperature sensors 10 within an area range of A3 have identical incident angles.

The incident angles of the part of the n infrared temperature sensors 10 within the area range of A1 is different from that of the another part of the n infrared temperature sensors 10 within the area range of A2. The incident angles of the another part of the n infrared temperature sensors 10 within the area range of A2 is different from that of the yet another part of the n infrared temperature sensors 10 within the area range of A3. The incident angles of the yet another part of the n infrared temperature sensors 10 within the area range of A3 is different from that of the part of the n infrared temperature sensors 10 within the area range of A1.

Furthermore, since the spectrum of the n infrared temperature sensors 10 is affected by the different incident angles of the different infrared beams that are received, the same temperature calibration regression coefficients can be applied with the infrared beams within the same range of view (the area rage A1, the area range A2, and the area range A3). Therefore, the temperature sensing system S is not required to be stored with a huge amount of temperature calibration regression coefficients, thereby reducing storage in a memory of the temperature sensing system S and increasing the calculation speed.

Beneficial Effects of Embodiments

One of the advantages of the present disclosure is that the temperature calibration method of the infrared thermal image camera is able to increase an accuracy of the temperature sensing system S through calibrating the uncalibrated temperature to the calibrated temperature according to the uncalibrated temperature and the temperature calibration function. Moreover, the calibration method of the temperature sensing system S of the infrared thermal image camera is able to increase the accuracy of the temperature sensing system S with the temperature calibration function through conducting the regression analysis to the plurality of measured temperatures and the plurality of predetermined temperatures to obtain the initial temperature calibration function, and utilizing the initial temperature calibration function to obtain the temperature calibration function.

Moreover, since the infrared thermal image camera has the plurality of infrared temperature sensors 10, most of the plurality of infrared temperature sensors 10 have different parameters. In addition, the radiation energy generated by the object under test enters the infrared thermal image camera with different incident angles. Therefore, the above-mentioned factors affect the accuracy of the infrared thermal image camera. The present disclosure is able to calibrate the uncalibrated temperatures that are measured respectively by the plurality of infrared temperature sensors 10 to the calibrated temperatures through the temperature calibration method provided in the first embodiment, thereby increasing the accuracy of the temperature sensing system S.

Furthermore, the temperature calibration method of the present disclosure is calculated through utilizing the temperature calibration function, and the calibration coefficients of the temperature calibration function are already known and stored in the temperature sensing system S through the calibration of each of the plurality of infrared temperature sensors 10 by the manufacturers before releasing the products. Therefore, the calibrated temperature can be obtained through substituting the uncalibrated temperatures measured by the temperature sensing system S into the temperature calibration function, and a calculation speed of the temperature calibration method of the present disclosure can be significantly increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A temperature calibration method of an infrared thermal image camera, comprising:
   providing a temperature sensing system to measure an object under test, so as to obtain an uncalibrated temperature; and
   calibrating the uncalibrated temperature to obtain a calibrated temperature, according to the uncalibrated temperature and a temperature calibration function;
   wherein the temperature calibration function is obtained through a regression analysis;
   wherein, before the step of measuring the object under test to obtain the uncalibrated temperature, the method further comprises: conducting the calibration method of the temperature sensing system, the calibration method of the temperature system including:

providing a black body having a preset temperature; and obtaining a calibration coefficient of the temperature sensing system and a system temperature coefficient;

wherein in the step of obtaining the calibration coefficient and the system temperature coefficient, an initial temperature measurement equation is utilized to obtain the calibration coefficient and the system temperature coefficient, and the initial temperature measurement equation includes the following relation:

$S1 = G1 \times (1 + tCo1 \times (T_{amb} - T_{de})) \times ((T1_{objNA})4 - (T_{amb})4)$;

wherein S is an initial digital signal that is obtained through the temperature sensing system measuring the black body, G1 is the calibration coefficient, tCo1 is the system temperature coefficient, $T_{amb}$ is an environment temperature, the environment temperature is in Kelvin, $T_{de}$ has a temperature of 298.15K, $T1_{objNA}$ is the preset temperature of the black body, and the preset temperature is in Kelvin;

wherein the preset temperature of the black body is known.

2. The temperature calibration method according to claim 1, wherein the temperature calibration function includes the following relation:

$T1_{obj} = (C1_0 + C1_1 \times T1_{objN} + C1_2 \times (T1_{objN})^2 + C1_3 \times (T1_{objN})^3 + C1_4 \times (T1_{objN})^4 + C1_5 \times (T1_{objN})^5)$;

wherein $T1_{obj}$ is the calibrated temperature of the object under test, the calibrated temperature is in Celsius, $T1_{objN}$ is the uncalibrated temperature of the object under test, the uncalibrated temperature of the temperature calibration function is in Celsius, $C1_0$ is a first temperature calibration regression coefficient, $C1_1$ is a second temperature calibration regression coefficient, $C1_2$ is a third temperature calibration regression coefficient, $C1_3$ is a fourth temperature calibration regression coefficient, $C1_4$ is a fifth temperature calibration regression coefficient, and $C1_5$ is a sixth temperature calibration regression coefficient.

3. The temperature calibration method according to claim 2, wherein the step of measuring the object under test to obtain the uncalibrated temperature includes:

utilizing the temperature sensing system to measure a radiation energy of the object under test so as to generate a digital signal; and calculating the uncalibrated temperature of the object under test according to the digital signal and a temperature measurement equation;

wherein the temperature measurement equation includes the following relation:

$S1 = G1 \times (1 + tCo1 \times (T_{amb} - T_{de})) \times ((T1_{objN})^4 - (T_{amb})^4)$;

wherein S1 is the digital signal, G1 is the calibration coefficient, tCo1 is the system temperature coefficient, $T_{amb}$ is the environment temperature, the environment temperature is in Kelvin, $T_{de}$ has a temperature of 298.15K, $T1_{objN}$ is the uncalibrated temperature of the object under test, and the uncalibrated temperature of the temperature measurement equation is in Kelvin.

4. The temperature calibration method according to claim 3, wherein values of the first temperature calibration regression coefficient, the second temperature calibration regression coefficient, the third temperature calibration regression coefficient, the fourth temperature calibration regression coefficient, the fifth temperature calibration regression coefficient, the sixth temperature calibration regression coefficient, the calibration coefficient, and the system temperature coefficient are stored in the temperature sensing system.

5. The temperature calibration method according to claim 4, wherein the values of each of the first temperature calibration regression coefficient, the second temperature calibration regression coefficient, the third temperature calibration regression coefficient, the fourth temperature calibration regression coefficient, the fifth temperature calibration regression coefficient, the sixth temperature calibration regression coefficient, the calibration coefficient, and the system temperature coefficient are generated when a calibration method of the temperature sensing system is conducted.

6. The temperature calibration method according to claim 1, wherein the step of obtaining the calibration coefficient and the system temperature coefficient includes:

obtaining the calibration coefficient under an environment that the environment temperature is 298.15K; and obtaining the system temperature coefficient under an environment where the environment temperature is not 298.15K, according to the obtained calibration coefficient.

7. The temperature calibration method according to claim 1, after obtaining the calibration coefficient and the system temperature coefficient of the temperature sensing system, further comprising:

providing a first radiation black body having a first predetermined temperature, a second radiation black body having a second predetermined temperature, a third radiation black body having a third predetermined temperature, a fourth radiation black body having a fourth predetermined temperature, a fifth radiation black body having a fifth predetermined temperature, and a sixth radiation black body having a sixth predetermined temperature, wherein the first predetermined temperature, the second predetermined temperature, the third predetermined temperature, the fourth predetermined temperature, the fifth predetermined temperature, and the sixth predetermined temperature are different from one another, and wherein each of the first predetermined temperature, the second predetermined temperature, the third predetermined temperature, the fourth predetermined temperature, the fifth predetermined temperature, and the sixth predetermined temperature is in Celsius;

utilizing the temperature sensing system to measure the first radiation black body, the second radiation black body, the third radiation black body the fourth radiation black body, the fifth radiation black body, and the sixth radiation black body, so as to obtain a first measured temperature, a second measured temperature, a third measured temperature, a fourth measured temperature, a fifth measured temperature, and a sixth measured temperature, respectively; wherein the first measured temperature corresponds to the first predetermined temperature, the second measured temperature corresponds to the second predetermined temperature, the third measured temperature corresponds to the third predetermined temperature, the fourth measured temperature corresponds to the fourth predetermined temperature, the fifth measured temperature corresponds to the fifth predetermined temperature, the sixth measured temperature corresponds to the sixth predetermined temperature; wherein each of the first measured temperature, the second measured temperature, the third measured temperature, the fourth measured temperature, the fifth measured temperature, and the sixth measured temperature is in Celsius;

conducting a regression analysis to the first measured temperature, the second measured temperature, the third measured temperature, the fourth measured temperature, the fifth measured temperature, the sixth measured temperature, the first predetermined temperature, the second predetermined temperature, the third predetermined temperature, the fourth predetermined temperature, the fifth predetermined temperature, and the sixth predetermined temperature, so as to obtain an initial temperature calibration function; and utilizing the initial temperature calibration function to obtain the temperature calibration function;

wherein the initial temperature calibration function includes the following relation:

$T_{obj} = (C1_0 + C1_1 \times T1_{objNB} + C1_2 \times (To_{bjNB})^2 + C1_3 \times (To_{bjNB})^3 + C1_4 \times (To_{bjNB})^4 + C1_5 \times (To_{bjNB})^5)$;

wherein in the step of obtaining the initial temperature calibration function, values of each of the first predetermined temperature, the second predetermined temperature, the third predetermined temperature, the fourth predetermined temperature, the fifth predetermined temperature, and the sixth predetermined temperature are sequentially substituted into $T_{obj}$, and values of each of the first measured temperature, the second measured temperature, the third measured temperature, the fourth measured temperature, the fifth measured temperature, and the sixth measured temperature are sequentially substituted into $T_{objNB}$, and then the regression analysis is conducted to obtain the first temperature calibration regression coefficient, the second temperature calibration regression coefficient, the third temperature calibration regression coefficient, the fourth temperature calibration regression coefficient, the fifth temperature calibration regression coefficient, and the sixth temperature calibration regression coefficient of the temperature calibration function.

8. A temperature calibration method of a temperature sensing system of an infrared thermal image camera, comprising:

providing a black body with a preset temperature;

obtaining a calibration coefficient and a system temperature coefficient of the temperature sensing system;

providing a plurality of radiation black bodies, wherein the plurality of radiation black bodies respectively have a plurality of preset temperatures that are different from one another;

utilizing the temperature sensing system to measure the plurality of radiation black bodies to obtain a plurality of measured temperatures;

conducting a regression analysis of the plurality of measured temperatures and the plurality of preset temperatures, so as to obtain an initial temperature calibration function; and utilizing the initial temperature calibration function to obtain a temperature calibration function;

wherein, when obtaining the calibration coefficient and the system temperature coefficient, an initial temperature measurement equation is utilized to obtain the calibration coefficient and the system temperature coefficient, and the initial temperature measurement equation includes the following relation:

$S = G1 \times (1 + tCo1 \times (T_{amb} - T_{de})) \times ((To_{bjNA})^4 - (T_{amb})^4)$;

wherein S is an initial digital signal that is obtained through the temperature sensing system measuring the black body, G1 is the calibration coefficient, tCo1 is the system temperature coefficient, $T_{amb}$ is an environment temperature, the environment temperature is in Kelvin, $T_{de}$ has a temperature of 298.15K, $To_{bjNA}$ is the preset temperature of the black body, and the preset temperature is in Kelvin;

wherein the preset temperature of the black body is known.

9. The temperature calibration method according to claim 8, wherein the step of obtaining the calibration coefficient and the system temperature coefficient includes:

obtaining the calibration coefficient under an environment that the environment temperature is 298.15K; and obtaining the system temperature coefficient under an environment that the environment temperature is not 298.15K, according to the obtained calibration coefficient.

10. The temperature calibration method according to claim 8, wherein the initial temperature calibration function includes the following relation:

$T_{obj} = (C1_0 + C1_1 \times T_{objNB} + C1_2 \times (T_{objNB})^2 + C1_3 \times (T_{objNB})^3 + C1_4 \times (T_{objNB})^4 + C1_5 \times (T_{objNB})^5)$;

wherein $C1_0$, $C1_1$, $C1_2$, $C1_3$, $C1_4$, and $C1_5$ are each a temperature calibration regression coefficient;

wherein, when obtaining the initial temperature calibration function, values of each of the plurality of preset temperatures are sequentially substituted into $T_{obj}$, and values of the plurality of measured temperatures are sequentially substituted into $T_{objNB}$, and then the regression analysis is conducted to obtain the plurality of temperature calibration regression coefficient;

wherein each of the plurality of preset temperatures is in Celsius, and each of the plurality of measured temperatures is in Celsius.

11. The temperature calibration method according to claim 10, the temperature calibration function includes the following relation:

$T1_{obj} = (C1_0 + C1_1 \times T1_{objN} + C1_2 \times (T1_{objN})^2 + C1_3 \times (T1_{objN})^3 + C1_4 \times (T1_{objN})^4 + C1_5 \times (T1_{objN})^5)$;

wherein $T1_{obj}$ is a calibrated temperature of an object under test, the calibrated temperature is in Celsius, $T1_{objN}$ is an uncalibrated temperature of the object under test, the uncalibrated temperature of the temperature calibration function is in Celsius, and $C1_0$, $C1_1$, $C1_2$, $C1_3$, $C1_4$, and $C1_5$ are each the temperature calibration regression coefficient.

* * * * *